(12) United States Patent
Irgens

(10) Patent No.: US 9,314,910 B2
(45) Date of Patent: Apr. 19, 2016

(54) HOT BOLTING CLAMP

(76) Inventor: Per-Christian Irgens, Nesoya (NO)

( * ) Notice: Subject to any disclaimer, the term of this patent is extended or adjusted under 35 U.S.C. 154(b) by 496 days.

(21) Appl. No.: 12/731,383

(22) Filed: Mar. 25, 2010

(65) Prior Publication Data

US 2010/0244443 A1    Sep. 30, 2010

(30) Foreign Application Priority Data

Mar. 26, 2009  (NO) .................................... 20091269

(51) Int. Cl.
  *F16L 23/028* (2006.01)
  *B25B 27/16* (2006.01)
  *F16L 23/032* (2006.01)
  *F16L 23/036* (2006.01)

(52) U.S. Cl.
  CPC ............... *B25B 27/16* (2013.01); *F16L 23/032* (2013.01); *F16L 23/036* (2013.01)

(58) Field of Classification Search
  CPC ......... F16L 23/00; F16L 23/003; F16L 23/02; F16L 23/024; F16L 23/036
  USPC ............... 285/15, 16, 17, 413, 414, 368, 412; 403/337, 338; 411/546
  See application file for complete search history.

(56) References Cited

U.S. PATENT DOCUMENTS

| | | | | |
|---|---|---|---|---|
| 1,156,493 A | * | 10/1915 | Rice | F16D 1/033 403/337 |
| 2,985,466 A | * | 5/1961 | Solomon | F16L 23/02 285/368 X |
| 3,332,710 A | * | 7/1967 | Doty | F16L 49/04 285/368 X |
| 3,794,363 A | * | 2/1974 | Schulz | F16L 23/032 285/368 X |
| 4,150,477 A | | 4/1979 | Orr | |
| 5,340,258 A | * | 8/1994 | Simon | F16B 35/005 411/546 X |
| 5,374,086 A | * | 12/1994 | Higgins | F01N 13/1811 285/368 X |
| 6,023,899 A | * | 2/2000 | Mecozzi | E04B 1/617 403/337 X |
| 6,315,335 B1 | * | 11/2001 | Seedorff | 285/415 |
| 6,467,811 B2 | * | 10/2002 | Mitchell | 285/15 |
| 6,669,422 B1 | * | 12/2003 | Sterle | F16B 5/0233 411/546 X |
| 2008/0093847 A1 | * | 4/2008 | Sundholm | F16L 23/032 285/368 |

FOREIGN PATENT DOCUMENTS

GB    2138903 A    * 10/1984

* cited by examiner

*Primary Examiner* — Gregory Binda
(74) *Attorney, Agent, or Firm* — Thomas Schneck; Gina McCarthy

(57) ABSTRACT

Dynamical flange clamp for strengthening flange couplings or taking over the bolt forces in a loaded flange coupling, where opposite clamps (1, 2) are preloaded towards each other, contraholders (3) are fitted on one of the clamps (2), functioning as back stop to absorb the preload. When installed on a flange connection the gasket stress is kept virtually constant during the transfer of forces between the flange coupling bolts and the flange clamp. This is done without any further adjustments to the dynamical flange clamp. The dynamic flange clamp is particularly useful during bolt changes in a Hot Bolting operation.

4 Claims, 2 Drawing Sheets

HOT BOLTING CLAMP

TECHNICAL FIELD

The invention relates to a dynamical flange clamp useful for strengthening flange couplings or taking over the bolt forces in loaded flange couplings. In particular the invention is useful for bolt changes in a Hot Bolting operation.

BACKGROUND OF THE INVENTION

Flange couplings being loaded with inner pressure or outer forces have a limited possibility for inspection and change of bolts without weakening the integrity of the coupling at the same time. Traditional clamps are difficult to adjust in such as way that a flange couplings gasket stress is held constant during transferal of forces from existing flange bolts and to the clamp. Typical equipment being used to preload flanged couplings is designed as described in U.S. Pat. No. 4,150,477 A1. By using such equipment to ensure constant gasket stress during bolt change, it is difficult to increase the pressure used on the tool to compensate exactly for the reduction in bolt forces during the unscrewing of the bolts. Likewise it is challenging to reduce the pressure used on the tool to compensate exactly for the increase in bolt forces during tightening of new bolts. Old corroded or cracked bolts suddenly tearing during unscrewing, presents further challenges related to the adjustment of the tool pressure to compensate for the loss of bolt force.

SUMMARY DISCLOSURE

According to one aspect of the invention, there is provided a flange clamp comprising opposing first and second clamp parts that are preloaded towards each other by a preloading parts. The clamp also comprises contraholders arranged to work as a back stop to absorb the preload. A position of each of the first and second contraholders within the second clamp part is adjustable to achieve contact of each of the first and second contraholders with the first clamp part.

By the use of a dynamical flange clamp according to the invention, the gasket stress is kept virtually constant during transfer of forces between the flange coupling bolts and the flange clamp. This is done without any further adjustments to the dynamical flange clamp.

According to one or more embodiments of the invention this is achieved by preloading the flange clamp to a higher force level than the existing force level of the flange coupling on which it is to be used, while there the contraholders prevent the preload of the clamp from being transferred before the bolts of the flange coupling are unscrewed. The function of the contraholders is to limit the movement of the clamps in relation to each other in such a way that the clamp under preloading will be mechanically prevented from increasing the load on the flange coupling.

BRIEF DESCRIPTION OF DRAWINGS

The flange clamp according to the invention is illustrated by three drawings.

DESCRIPTION OF INVENTION

Figure 1:
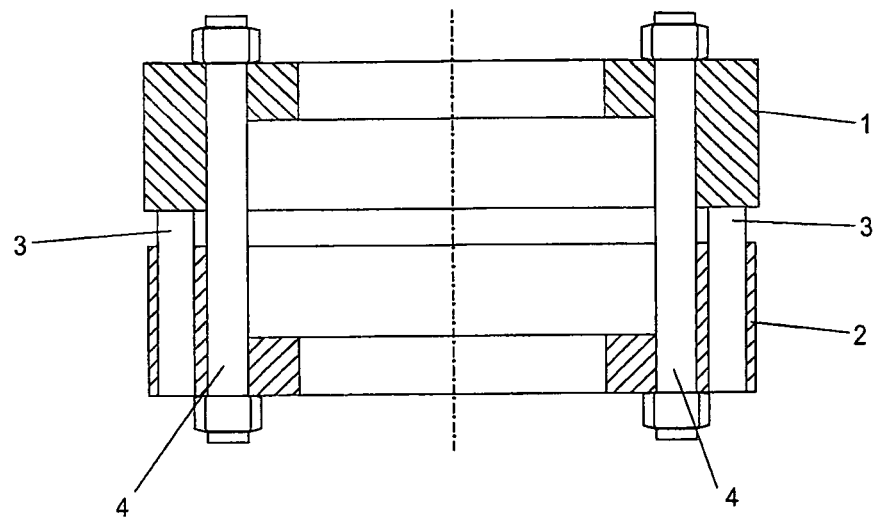
FIG. 1 presents a section of the flange clamp in a closed position, without flange coupling FIG. 2 gives a section view of the flanges clamp in a closed position enclosing a typical flange coupling
Figure 2:
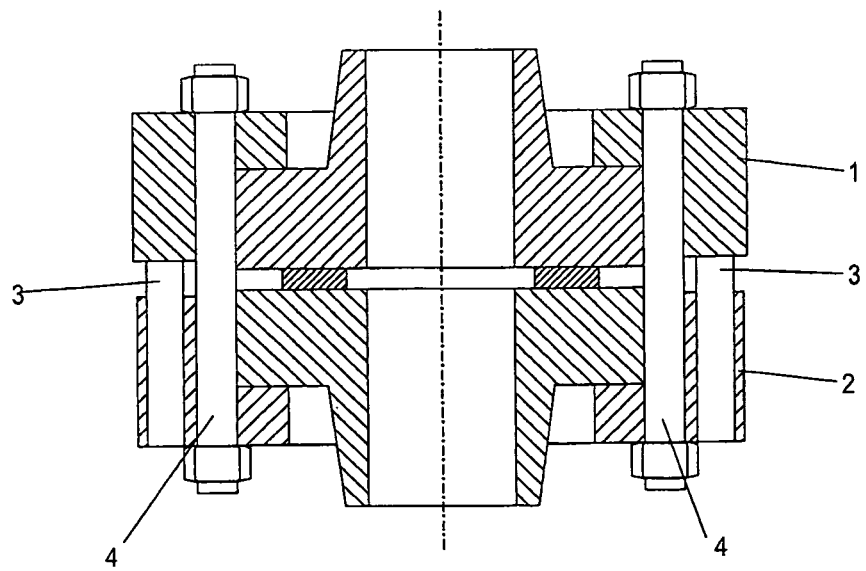

The two halves 1 and 2 of the flange clamp are preferred preloaded to each other by through bolts 4, but the claimed invention is not limited by this preloading method.

Clamp half 2 includes contraholders 3, being adjustable by using for example socket screws that are threaded in the clamp half 2, but the claimed invention is not limited by this specific type of contraholder. Before the two halves 1 and 2 of the flange clamp are preloaded to each other, the contraholders must be adjusted to the appropriate height to achieve contact with clamp half 1. With use of socket screws as contraholders, the adjustment will be achieved by tightening each individual socket screw.

The size and number of bolts 4 must not be less than the flange connections bolts that are to be changed. The number of contraholders and their total contact area must not be less than the number and total area of bolts 4. The clamps with bolting are preferred manufactured in steel.

Figure 3:
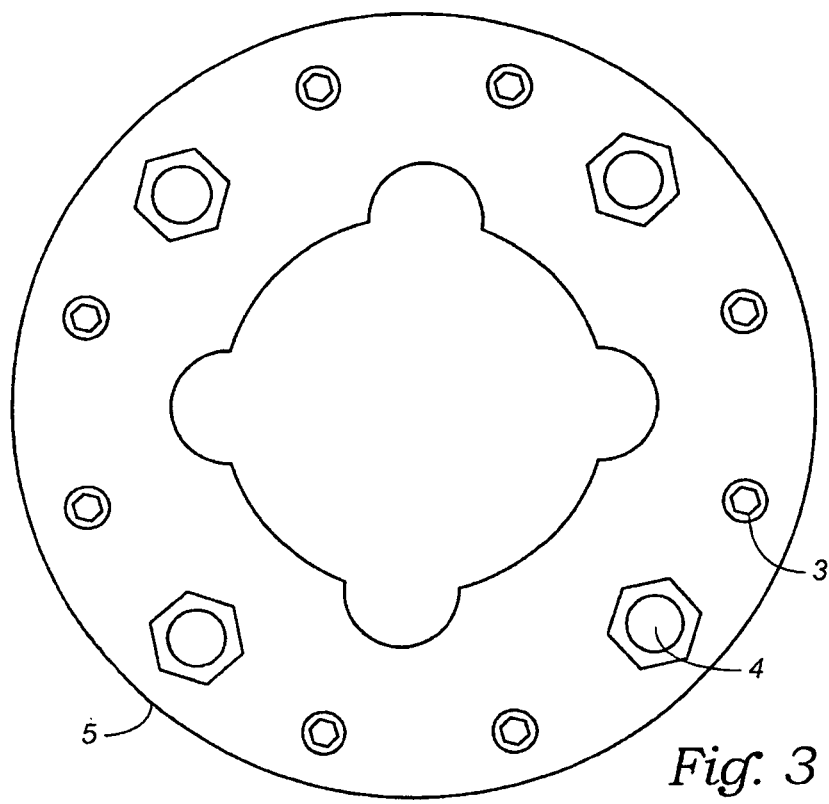
FIG. 3 is a bottom view of a lower flange clamp half comprising a ring.
Figure 4:
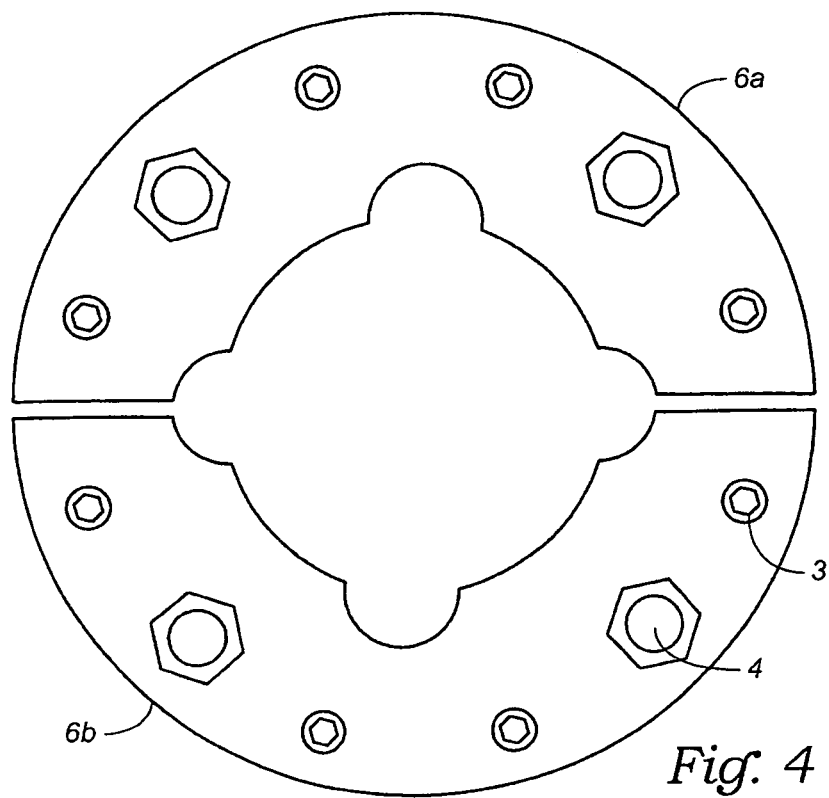
FIG. 4 is a bottom view of a lower flange clamp half comprising ring segments.

The dynamical flange clamp rings, such as ring 5 seen in FIG. 3, can be split in two or more segments 6a, 6b, as seen in FIG. 4, to accommodate installation on pipeline flange couplings. Each segment will then contain bolts 4 and contraholders 3. A full flange clamp circle is not necessary if only a limited number of bolts shall be changes on a flange connection. In these cases, the clamp segment must be placed accordingly to these bolts.

A typical working procedure for application of the invention in a Hot Bolting operation could be:
1. Fit the dynamical flange clamp segments around the flange coupling
2. Ensure that the contraholders 3 are not touching the clamp half 1
3. Tighten the clamp bolts 4 until the clamp parts have full contact with the flanges
4. Let the clamp and bolts be tempered to the same temperature as the flange coupling
5. Adjust the contraholders 3 to achieve contact with clamp half 1
6. Preload the clamp bolts 4 to a higher force level than the existing force level of the flange coupling bolts
7. Change the flange coupling bolts and preload them to the required level
8. Remove the dynamical flange clamp.

The invention claimed is:

1. A flange clamp comprising,
opposing first and second clamp parts clamping a flange under pressure during a bolt exchange with preloading parts arranged to preload the opposing clamp parts towards each other, the first clamp part having a lower outer surface opposing an upper outer surface of the second clamp part; and
first and second contraholders, wherein a radial position of each of the first and second contraholders within the second clamp part is outside of an outer diameter of the flange without contacting the flange, wherein a position of each of the first and second contraholders within the second clamp part is adjustable to achieve contact of each of the first and second contraholders with the first clamp part and wherein each of the first and second contraholders is in contact with the lower outer surface of the first clamp part when the contraholders are in use;
wherein the clamp parts are preloaded toward each other while maintaining the flange under pressure, the contraholders in contact with the lower outer surface of the first clamp part each operate as a back stop to absorb the preload outside of the flange.

2. A flange clamp according to claim 1, wherein the clamp parts are provided as whole rings.

3. A flange clamp according to claim 1, wherein the clamp parts are split into segments.

4. A flange clamp according to claim 1, wherein the preloading parts extend through the second clamp part.

* * * * *